United States Patent [19]

Bolz et al.

[11] Patent Number: 4,980,029
[45] Date of Patent: Dec. 25, 1990

[54] APPARATUS FOR TREATING WASTE MATERIALS

[75] Inventors: Alfred Bolz, Wangen im Allgäu; Günther Boos, Argenbühl, both of Fed. Rep. of Germany

[73] Assignee: Alfred Bolz GmbH & Co. KG, Wangen, Fed. Rep. of Germany

[21] Appl. No.: 300,609

[22] Filed: Jan. 23, 1989

[30] Foreign Application Priority Data

Jan. 23, 1988 [EP] European Pat. Off. ........ 88100995.5
Aug. 13, 1988 [EP] European Pat. Off. ........ 88113191.6

[51] Int. Cl.$^5$ .............................................. C10B 1/00
[52] U.S. Cl. ...................................... 202/105; 48/89; 48/111; 48/119; 202/106; 202/110; 202/113; 202/217; 202/220; 202/265; 202/269; 202/118
[58] Field of Search ................. 202/83, 106, 109, 110, 202/113, 115, 116, 118, 124, 126, 217, 220, 265, 262, 269, 270, 105; 422/189, 202, 225, 308, 309; 110/242; 34/180, 166, 209; 432/128, 151, 207; 48/89, 111, 118.5, 119, 174; 201/7, 35, 41, 43, 44

[56] References Cited

U.S. PATENT DOCUMENTS

| | | | |
|---|---|---|---|
| 742,351 | 10/1903 | Pittman | 202/83 |
| 1,276,866 | 8/1918 | Boyle | 202/113 |
| 1,561,735 | 11/1925 | Lucas | 202/83 |
| 1,600,639 | 9/1926 | McElvaney et al. | 48/118.5 |
| 1,674,420 | 6/1928 | Trumble | 201/35 |
| 1,706,825 | 3/1929 | Dvorkovitz | 202/113 |
| 1,836,051 | 12/1931 | Trumble | 202/113 |
| 3,546,092 | 12/1970 | Whiteacre | 201/7 |
| 3,775,863 | 12/1973 | Updegrove | 34/166 |
| 4,235,676 | 11/1980 | Chambers | 202/118 |
| 4,245,399 | 1/1981 | Muller et al. | 34/166 |

FOREIGN PATENT DOCUMENTS

| | | |
|---|---|---|
| 119700 | 3/1945 | Australia . |
| 3803 | 9/1979 | European Pat. Off. . |
| 3605638 | 8/1987 | Fed. Rep. of Germany . |
| 3512887 | 11/1987 | Fed. Rep. of Germany . |

Primary Examiner—Joye L. Woodard
Attorney, Agent, or Firm—Peter K. Kontler

[57] ABSTRACT

Gaseous, liquid and solid fuels are recovered from carbonaceous organic waste material by treating charges of waste material in several successive stages including preheating, drying and conversion into solid and gaseous phases, all as a result of heating in a common vessel or in two or three successive vessels. The solid phases are thereupon cooled prior to admission into a bin, either in a separate vessel or in the vessel for conversion into solid and gaseous phases. The gaseous phases are treated to separate oil from reaction water, combustible gases and inert gases. The charges are heated from without and are sealed from the atmosphere during all four stages of treatment. Each charge is mixed during heating and the intensity of mixing action, the heating action and/or the pressure in the vessel can be varied during one or more stages.

4 Claims, 5 Drawing Sheets

APPARATUS FOR TREATING WASTE MATERIALS

BACKGROUND OF THE INVENTION

The invention relates to a process and to an apparatus for treating waste materials, especially for recovering fuel from organic substances. More particularly, the invention relates to improvements in processes and apparatus for treating waste materials at elevated temperatures and under exclusion of air.

The quantity of domestic and industrial waste is on the increase at an alarming rate and, therefore, orderly disposal of such waste is of utmost importance and urgency. Experts in the field of waste material disposal predict that, within decades, the expenditures for disposal of waste material will match those for numerous costly public projects such as education and road building. Moreover, while the available supplies of fuel and other basic materials are steadily decreasing, waste materials contain large quantities of recoverable and reusable ingredients. This applies not only for untreated refuse but also for decomposed waste materials such as sewage sludge as well as purely biological waste materials, for example, discarded surplus agricultural products and rapes which develop in wineries, breweries and similar plants.

Recovery of valuable substances from waste materials is an important industry in many developed countries. For example, it is well known to heat dried sewage sludge in the absence of air in order to convert it into coke, oil, combustible and non-combustible gases and reaction water.

Published German patent application No. 30 42 964 of Bayer discloses a process for recovering solid and flowable fuels from biological materials. The material to be treated is heated to between 200° and 600° C. for intervals of time which depend upon the nature of treated material.

Published European patent application No. 0 052 334 of Bayer discloses a continuous process for treatment of solid starting materials (such as granular or pulverulent sewage sludge) which involves conveying the material to be treated through a tubular reaction vessel by a feed screw. The treatment takes up an interval of 2–3 hours, and the material is heated at a rate of 5°–30° C. per minute.

Published German patent application No. 36 05 638 of Hatlapa discloses a process for recovery of gases from an organic material which is admitted into the narrower end of a conical centrifuge and is pushed forwardly by the following material. Admission of air at the outlet of the centrifuge results in pyrolysis which entails the generation of low-temperature carbonization gas.

German-language publication "Korrespondenz Abwasser" (Volume 6, 1982, pages 377–381) discloses four different apparatus for continuous recovery of oil from biomass, namely a furnace which employs a screw conveyor, a rotary tubular kiln, a furnace which operates with a conveyor band and a shaft furnace. Each such apparatus provides a single treating chamber for continuous transport of waste material therethrough. The apparatus differ from each other only in the nature of means for conveying the material. The pressure which is applied to the treated material is identical in each part of the chamber; as a rule, the pressure slightly exceeds atmospheric pressure so as to ensure expulsion of low temperature carbonization gases from the chamber. The speed of transport of treated material must be changed uniformly in each and every part of the chamber. Therefore, degasification of the material can be influenced merely by changing the period of dwell of successive increments of material in the chamber and by changing the temperature in the chamber.

Published European patent application No. 0 003 803 of Solbakken et al. discloses a process and a plant for manufacturing carbonaceous solids and hydrocarbons from discarded tires. The tires are comminuted, relieved of metallic reinforcing material and subjected to pyrolysis in a revolving tubular vessel. The treated material advances continuously, first through the tubular vessel and thereupon through a cooling unit.

U.S. Pat. No. 1,674,420 to Trumble discloses a process and an apparatus for recovering oils from oil shales. The material to be treated is admitted first into a preheater, thereupon into a main treating (distilling) chamber, and finally into a cooling chamber. The treatment involves contacting the material with steam.

Australian patent No. 119,700 to Jacomini discloses a process and an apparatus for treating oil shale. Batches of oil shale are admitted alternatingly into two retorts in each of which the admitted material remains until the treatment is completed. Distillation takes place as a result of admission of preheated gaseous fluids.

Published German patent application No. 29 11 905 discloses a process for neutralization of pulverulent brown coal which is stored in bunkers. The treatment includes filling the bunker prior to sealing its contents from the atmosphere.

OBJECTS OF THE INVENTION

An object of the invention is to provide a novel and improved process for treating waste materials which is more economical than heretofore known processes.

Another object of the invention is to provide a novel and improved method of economically heating and cooling waste material during recovery of solid and gaseous fuels.

A further object of the invention is to provide a novel and improved process for simultaneously treating large quantities of waste material in a small area.

An additional object of the invention is to provide a process which renders it possible to recover all, or practically all, valuable constituents of organic waste materials.

Still another object of the invention is to provide a novel and improved apparatus for the practice of the above outlined process.

A further object of the invention is to provide the apparatus with a novel and improved system of vessels for raw and partially treated waste materials.

Another object of the invention is to provide the apparatus with novel and improved means for heating and cooling the vessels.

An additional object of the invention is to provide the apparatus with novel and improved means for treating batches or charges of waste material.

SUMMARY OF THE INVENTION

One feature of the invention resides in the provision of a process for converting carbonaceous waste material at elevated temperatures of 200° to 600° C. into a solid phase and a gaseous phase which is at least partially liquefiable as a result of cooling, particularly in the provision of a process for recovering fuel from organic waste material. The improved process comprises processing discrete charges or batches of waste material including the steps of simultaneously sealing a plurality of charges in a plurality of vessels from each other and from the atmosphere, and treating each charge in a plurality of successive stages including individually selecting the operating parameters (such as the temperature, the pressure and/or the rate of mixing of the material of charges) for the charges in the vessels. The treating step includes externally heating the charges in at least one of the vessels and mixing the charges in at least one of the vessels. The process preferably further comprises the step of varying or regulating at least one operating parameter (e.g., the temperature and/or the pressure and/or the rate of mixing) in at least one of its vessels.

As a rule, or at least in many instances, the treatment of charges during one of the stages will take up more heat than the treatment during each other stage. The selecting step of such process preferably includes selecting the parameters for treatment during the one stage with a view to ensure that the interval of time which is required for completion of the one stage is reduced to a minimum.

The selecting step can include choosing the operating parameters for treatment during each of the stages in such a way that the duration of treatment of charges during one of the stages equals or at least approximates the duration of treatment during each other stage. This renders it possible to ensure that evacuation of the contents of all vessels, or admission of charges into all vessels, can take place simultaneously or nearly simultaneously.

The aforementioned stages preferably include heating the charges, drying the heated charges, and converting the dried charges into solid and gaseous phases. If the waste material contains moisture, the selecting step can include subjecting the charges to a pressure which is above the evaporation pressure of moisture during heating of the charges, subjecting charges to a pressure which is below the evaporation pressure during drying of the charges, and maintaining the temperature of charges within predetermined ranges during heating and drying. The pressure during heating of the charges can be at least slightly above atmospheric pressure and the heating step can include raising the temperature of the charges to slightly above 100° C. The pressure during drying of the charges is preferably below atmospheric pressure, and the drying can include maintaining the temperature of the charges at or close to 100° C.

Drying of moisture-containing charges normally involves the generation of steam, and the treating step can include utilizing the thus generated steam to heat the charges during at least one of the stages.

If the gaseous phase contains combustible gases the process can further comprise the step of combusting such gases with the attendant generation of hot combustion products. The treating step of such process can include heating the charges with combustion products during conversion of dried charges into solid and gaseous phases. The heating can involve transferring heat from combustion products to oil or another suitable heat exchange fluid and utilizing the heat exchange fluid to heat the charges in the course of the converting step with attendant cooling of the heat exchange fluid. The treating step of such process can further comprise utilizing the cooled heat exchange fluid to heat the charges in the course of at least one of the heating and drying steps.

As mentioned above, waste material can contain moisture and at least one of the heating, drying and converting steps then preferably includes conversion of moisture into steam. The heating step of such process can include transferring heat from combustion products to the heat exchange fluid and utilizing the heat exchange fluid to heat the charges in the course of the converting step with attendant cooling of the heat exchange fluid. The thus cooled heat exchange fluid can be utilized to superheat the steam.

The solid phase which is obtained in the course of the converting step includes coal or coke. Such process preferably further comprises the step of cooling the solid phase below its combustion temperature while the solid phase is sealed from the atmosphere in at least one of the vessels. The step of cooling the solid phase can include effecting an exchange of heat between the cooled heat exchange fluid and the solid phase.

If the gaseous phases of converted charges contain an inert gas (such as carbon dioxide), the process can further comprise the step of utilizing inert gas to establish for the charges an oxygen-free protective atmosphere during at least one of the heating, drying, converting and cooling stages, particularly during the cooling stage.

The process can include the step of carrying out at least two successive stages (such as heating and drying of the charges) in a common vessel.

Another feature of the present invention resides in the provision of an apparatus for converting waste material at temperatures of 200° to 600° C. into a solid phase and a gaseous phase which is at least partially liquefiable as a result of cooling, particularly for recovering fuel from carbonaceous organic waste material. The improved apparatus comprises means for sealing discrete batches or charges of waste material from the atmosphere, including a plurality of vessels for discrete charges. Each of the vessels has a sealable charge-admitting inlet and a sealable material-discharging outlet, and the apparatus further comprises means for simultaneously treating the charges in the vessels, including means for mixing the charges in at least one of the vessels and means for externally heating the charges in at least one of the vessels.

The vessels include a first vessel and a second vessel in series with the first vessel (i.e., the second vessel receives partially treated charges from the first vessel). The outlet of the first vessel can be disposed above the inlet of the second vessel so that the second vessel can receive charges by gravity feed.

The sealing means can include four vessels, and the heating means of treating means in such apparatus can comprise means for preheating charges in at least one of the vessels, means for drying charges (particularly for drying preheated charges) in at least one of the vessels, and means for converting charges (particularly dried charges) into solid and gaseous phases in at least one of the vessels. At least one of the vessels can be arranged to cool solid phases of the charges. The four vessels can be connected in series.

The treating means can include means for treating charges in the least one vessel in at least two successive stages, and such treating means can include means for selecting the pressure in the at least one vessel. The treating means of such apparatus further comprises means for adjusting at least one of the heating, pressure selecting and mixing means. The vessels can include at least two vessels in which the charges are subjected to a plurality of successive treatments, and such at least two vessels are then connected in parallel. The adjusting means then preferably comprises means for interchanging or alternating the treatment of charges in the at least two vessels (for example, the charge in one of the at least two vessels can be preheated while the charge in the other of the two vessels is being dried, and the preheated charge in the one vessel is thereupon dried while the treatment in the other vessel involves preheating of a freshly admitted charge). It is also possible to provide three vessels in each of which the charges are subjected to a plurality of successive treatments. The three vessels are connected in parallel and the sealing means comprises a fourth vessel which is in series with each of the three vessels. The treating means of such apparatus further includes means for cooling the charges in the fourth vessel. Alternatively, the sealing means includes two vessels in each of which the charges are subjected to at least two successive treatments, a third vessel which is in series with the two vessels, and a fourth vessel in series with the third vessel. The treating means of such apparatus includes means for effecting conversion of charges into solid and gaseous phases in the third vessel and means for cooling the solid phases of charges in the fourth vessel. Still further, the apparatus can comprise two vessels wherein the charges are subjected to several successive treatments, and two additional vessels each in series with one of the two vessels. The treating means of such apparatus preferably comprises means for effecting conversion of charges and means for cooling charges in each of the additional vessels. The adjusting means preferably comprises means for cyclically interchanging or alternating the processing of charges in the additional vessels so that the charge in one of the additional vessels is cooled while the charge in the other additional vessel is being converted into solid and gaseous phases, and vice versa.

The at least one vessel preferably includes an upper portion (e.g., a substantially dome-shaped upper portion) and a downwardly converging or tapering lower portion which is adjacent the heating means. The mixing means is preferably rotatable about the axis of the conical portion and can include at least one rotary helical mixing element having an axis of rotation which is inclined with reference to the axis of the conical portion of the at least one vessel and is inwardly adjacent and orbits along the conical portion.

The vessels can include a first vessel and a second vessel which receives charges from the first vessel. The treating means can include means for converting charges in the second vessel into solid and gaseous phases, and the capacity of the first vessel preferably exceeds the capacity of the second vessel. If the treating means includes means for cooling the contents of the second vessel, the capacity of the first vessel also preferably exceeds the capacity of the second vessel.

The vessels can include a first and a second vessel, and the heating means can comprise a first heating unit for heating the contents of one of the first and second vessels to a first temperature and a second heating unit for heating the contents of the other of the first and second vessels to a second temperature which is higher than the first temperature. Each of the heating units can include means for circulating oil or another suitable heat exchange fluid, and such apparatus can further comprise means for conveying heat exchange fluid from the second heating means to the first heating means.

The treating means can include means for converting charges in the least one vessel into solid and non-liquefiable gaseous phases, and such apparatus preferably further comprises means (e.g., a tank) for accumulating the gaseous phase which is obtained in the at least one vessel and means for conveying the gaseous phase from the accumulating means to the treating means for use in connection with the treatment of charges in the vessels. The gaseous phase in the accumulating means can include an inert gas and the accumulating means has outlet means for inert gas. The conveying means can include means for admitting inert gas into at least one of the vessels by way of the treating means so as to expel oxygen from the respective vessel (oxygen can enter the vessel during admission and/or during evacuation of charges). The gaseous phase in the accumulating means can include a combustible gas, and the accumulating means is then provided with an outlet for combustible gas; the treating means of such apparatus can include at least one burner and the conveying means can include means for supplying combustible gas from the respective outlet of the accumulating means to the at least one burner. The treating means can include means for reducing the pressure in the at least one vessel, and such pressure reducing means can comprise a vacuum pump including or constituting a jet apparatus; the accumulating means then comprises at least one outlet of the gaseous phase and the conveying means includes means for supplying the gaseous phase from the outlet of the accumulating means to the jet apparatus of the pump.

The apparatus can comprise a first vessel, a second vessel which receives charges from the first vessel, and means for comminuting the charges between the outlet of the first vessel and the inlet of the second vessel. The treating means of such apparatus comprises means for converting charges in the second vessel into solid and gaseous phases, and the heating means comprises means for drying charges in the first vessel.

The apparatus can further comprise at least one conveyance for the vessels and the treating means, and the conveyance can comprise a wheel-mounted frame.

The heating means can comprise a plurality of (preferably different) heating units for the at least one vessel. For example, the heating means can comprise two heating units for each of at least two discrete vessels.

If the charges contain moisture, the heating of charges in the at least one vessel entails the generation of steam. Such apparatus preferably further comprises means for evacuating steam from the at least one vessel including a vacuum pump having a jet apparatus and means for conveying evacuated steam to the heating means wherein the steam undergoes condensation. The heating means has a first outlet for condensate and a second outlet for steam, and such apparatus further comprises a steam jet condenser which is connected with the second outlet of the heating means and a boiler which is connected with the first outlet of the heating means. This apparatus further comprises means for conveying steam from the boiler to the jet apparatus and to the condenser, and a superheater for steam.

The vessels can include a first vessel, a second vessel and a third vessel in series with at least one of the first and second vessels. The treating means can comprise a circuit having first and second heating means for respectively heating charges in the first and second vessels with oil or another suitable heat exchange fluid, a burner for raising the temperature of the heat exchange fluid, and means for cooling the charges in the third vessel. The treating means further comprises means for converting charges in one of the first and second vessels into solid and gaseous phases. If the charges contain moisture, at least one of the first and second heating means is arranged to heat the charges in the respective vessel to a temperature at which the charges release moisture which is converted into steam. The aforementioned circuit then further comprises means for superheating the steam with the heat exchange fluid.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
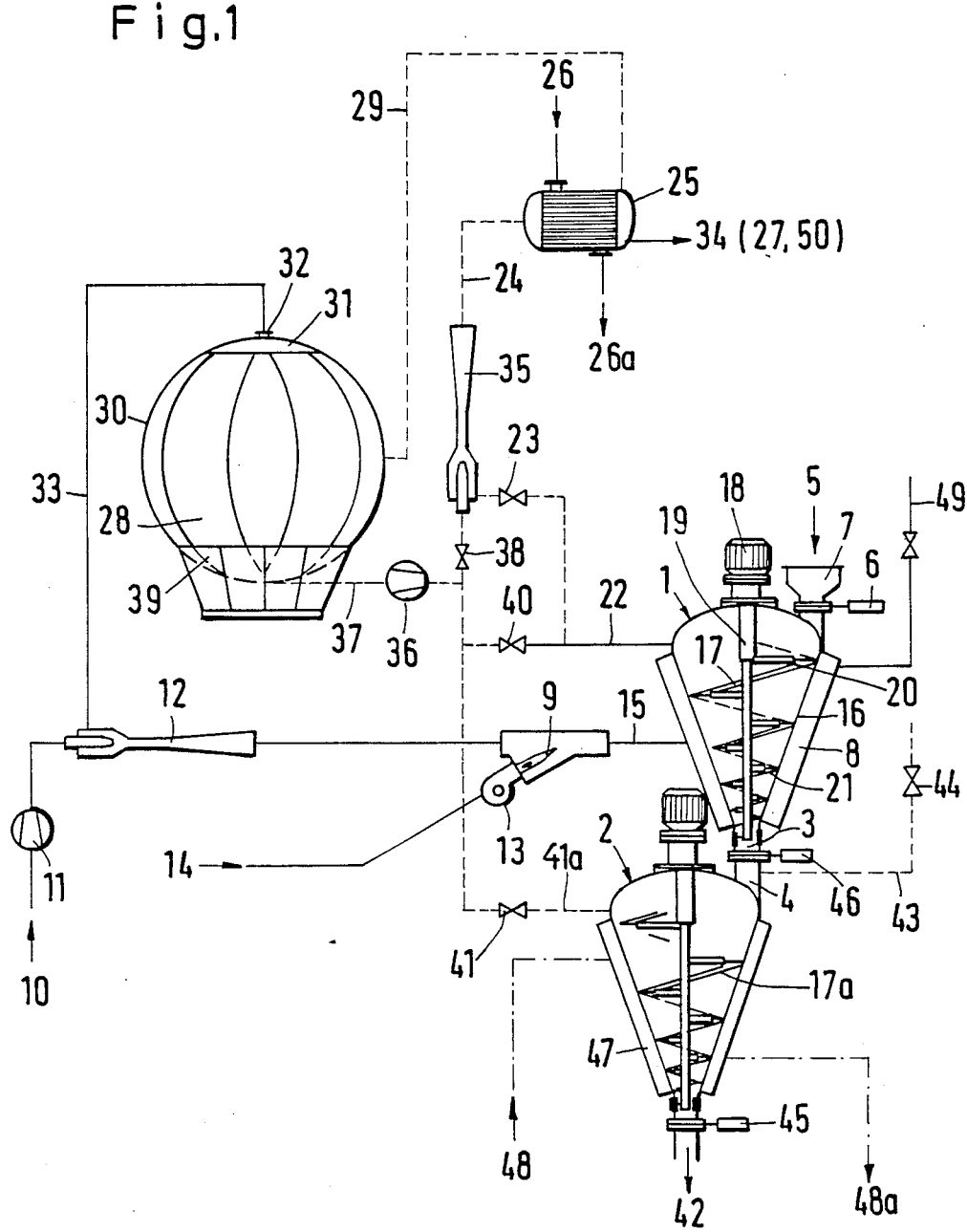
FIG. 1 is a diagrammatic view of an apparatus which embodies one form of the invention and operates with two vessels in series.

FIG. 1 shows an apparatus wherein the means for sealing discrete charges of organic waste material from the atmosphere comprises two discrete vessels 1 and 2. The means for treating the charge in the vessel 1 includes means for externally preheating the charge, means for drying the charge, and means for heating the charge to a temperature of 200° to 600° C. so as to convert it into a solid phase and an at least partially liquefiable gaseous phase. The means for treating the charge in the vessel 2 includes means for cooling the solid phase of the charge to a temperature which is sufficiently low to ensure that the carbonized solid phase is not combusted when contacted by oxygen or air.

The vessel 1 is installed at a level above the coolable vessel 2 in such a way that its sealable material-discharging outlet 3 is located at a level above and immediately adjacent the sealable charge-admitting inlet 4 of the vessel 2. The outlet 3 is provided in the bottom of the vessel 1, and the inlet 4 is provided in the substantially dome-shaped upper portion of the vessel 2.

The dome-shaped upper portion of the vessel 1 has a sealable funnel-shaped inlet 7 for discrete charges of organic material which are admitted in the direction of arrow 5. The means for sealing the inlet 7 comprises a reciprocable or otherwise movable slide valve or gate 6 which can be actuated by remote control so that it can be retracted immediately prior to admission of a fresh charge into the vessel 1. Fresh charges can be showered or forcibly admitted into the inlet 7, depending upon their consistency. A second slide valve or gate 46 controls the outlet 3 of the vessel 1; this gate is closed when the gate 6 is open to admit a fresh charge into the vessel 1. The gate 6 is closed when the vessel 1 contains a full charge, and the charge is then externally heated by a heating unit 8 which is adjacent the downwardly tapering conical lower portion or section 16 of the vessel 1.

The heating unit 8 forms part of the means for treating charges in the vessels 1, 2 and comprises a twin jacket defining a chamber for reception of hot gaseous combustion products. The heating unit 8 further comprises a burner 13 having a nozzle 9 which directs hot combustion products into a conduit 15 for admission into the chamber of the twin jacket of the heating unit 8. The latter further comprises an air compressor 11 having an inlet 10 for admission of air, and a jet apparatus 12 which conveys a stream of compressed air to the burner 13. The inlet for admission of fuel to the burner 13 is shown at 14. The jet apparatus 12 constitutes an optional feature of the heating unit 8. The inlet 14 can admit fuel oil, natural gas, town gas, propane or any other suitable gaseous or liquid fuel. Hot combustion products leave the burner nozzle 9 via conduit 15 and are introduced into the chamber of the twin jacket of the heating unit 8 to heat the charge in the vessel 1. Spent (i.e., cooled) combustion products leave the jacket of the heating unit 8 via evacuating conduit 49 which contains valve means for regulating the evacuation of combustion products. The heating unit 8 further comprises suitable means (not shown) for regulating the temperature of the charge in the vessel 1. Such regulating means includes means for monitoring the temperature of the charge and means for varying the rate of admission of fuel and/or air to the burner 13 and/or the rate of evacuation of spent combustion products via conduit 49. All components of the regulating means are not shown in FIG. 1 for the sake of clarity and also because the exact details thereof form no part of the invention.

In order to ensure rapid and uniform heating of a charge in the vessel 1, the means for treating charges in the vessels 1 and 2 further comprises a mixing unit 17 which operates in the conical lower portion or section 16 of the vessel 1 and includes a motor 18 serving to drive a shaft 19 which is rotatable about a vertical axis coinciding with the axis of the conical portion 16. The shaft 19 carries radially outwardly extending spokes 20 for helical mixing elements 21 which are inwardly adjacent the conical portion 16 and ensure pronounced intermixing of all ingredients of charge in the vessel 1 to thus promote uniform heating of the entire charge within a short interval of time. The motor 18 is preferably a variable-speed motor which can drive the shaft 19 at a number of different speeds in order to permit a regulation of the rate of mixing and of expulsion of gases from the confined charge.

The mixing and heating of a charge in the vessel 1 take place while the interior of the vessel is sealed from the surrounding atmosphere. The quantity of air in the filled vessel 1 is small and is spent shortly after the treatment of the confined charge begins. The charge thereupon begins to swell as a result of heating by the unit 8 and is carbonized. Gases which develop as a result of heating of the charge in the sealed vessel 1 escape via conduit 22, an open valve 23 and a conduit 24 which discharges the gases into a condenser 25. The latter is cooled by a coolant which enters by way of a first port 26 and leaves the condenser by way of a second port 26a. The condenser 25 can be cooled with water or in any other suitable way. The gaseous phase which enters the condenser 25 via conduit 24 contains primarily vaporized reaction water and oil. The outlet 34 of the condenser 25 discharges oil (27) and reaction water (50). Another outlet 29 of the condenser 25 discharges gases (28) which remain in a gaseous state (i.e., which are not condensed) at atmospheric pressure and at temperatures above 0° C. The outlet 29 is located at the top of the condenser 25 and admits the gases 28 into a tank 30 or an analogous accumulating means. Such gases contain (a) a gaseous fuel 31, essentially methane and carbon monoxide, which accumulates in the upper part of the tank 30, and (b) primarily carbon dioxide 39 which is heavier and accumulates in the lower portion of the tank 30. Gaseous fuel 31 is evacuated by way of an outlet 32 in the top portion of the tank 30 and is supplied to the burner 13 by way of a conduit 33. The purpose of the aforementioned jet apparatus 12 is to promote evacuation of gaseous fuel 31 from the tank 30 with assistance from compressed air which is supplied by the compressor 11. The discharge end of the conduit 33 is connected to the suction intake of the jet apparatus 12 which operates not unlike a venturi.

The liquid fraction which leaves the condenser 25 via outlet 34 is a mixture of oil 27 and reaction water 50. Such mixture is admitted into a collecting receptacle 106 (FIG. 3) wherein the oil 27 is separated from and floats on top of the body of reaction water 50 due to its lower specific weight.

Evacuation of gaseous phase from the charge which undergoes carbonization in the vessel 1 is promoted by reducing the pressure in the vessel below atmospheric pressure. This is achieved by installing a jet apparatus 35 in the conduit 24 downstream of the valve 23. The suction intake of the jet apparatus 35 is connected to the conduit 22 (i.e., to the interior of the vessel 1) by way of the open valve 23, and the pressure intake of the apparatus 35 is connected with the outlet of a compressor 36 for inert carbon dioxide gas 39. The inlet of the compressor 36 is connected with an outlet 37 in the lower portion of the tank 30, and the outlet of the compressor 36 communicates with the corresponding intake of the jet apparatus 35 by way of a valve 38. Compressed carbon dioxide gas 39 flowing from the compressor 36 into the conduit 24 acts as a propellant which creates suction in the conduit 22 to ensure rapid evacuation of gaseous phase from the interior of the vessel 1.

When the conversion of organic part of the charge in the vessel 1 into the solid and gaseous phases is completed, the solid phase (coke) 42 is admitted into the second vessel 2 by way of the outlet 3 and inlet 4 in response to opening of the gate 46 which is common to the vessels 1 and 2. The means for treating the solid phase 42 in the vessel 2 comprises a cooling unit 47. Since the solid phase 42 is sufficiently hot to undergo immediate combustion in response to contact with air or oxygen, the improved apparatus comprises means for expelling air from the interior of the vessel 2 prior to opening of the gate 46. Such air expelling means includes the aforementioned valve 38, a valve 40 between the outlet of the compressor 36 and the conduit 22, and a valve 41 in a conduit 41a connecting the outlet of the compressor 36 with the interior of the vessel 2. The valves 38 and 40 are closed and the valve 41 is opened to admit inert carbon dioxide gas into the vessel 2. Since the carbon dioxide gas is heavier than air, it expels air from the vessel 2 by way of a conduit 43 which communicates with the inlet 4. A suitable detector monitors the interior of the vessel 2 and initiates closing of a valve 44 in the conduit 43 when the expulsion of air from the vessel 2 is completed. The regulating means of the apparatus causes the gate 46 to open in response to or shortly after closing of the valve 44 so that the solid phase 42 can be transferred from the lower portion 16 of the vessel 1 into the interior of the vessel 2. The latter is or can be equipped with a mixer 17a which is or can be identical with or similar to the mixer 17 in the vessel 1 and promotes rapid cooling of the solid phase 42. The cooling unit 47 for the vessel 2 includes a twin jacket which surrounds the downwardly converging conical lower portion of the vessel 2 and has an inlet 48 for fresh coolant and an outlet 48a for spent coolant. The means for inducing the coolant (e.g., water) to flow through the jacket of the cooling unit 47 can include a pump or another fluid flow machine, not shown. The temperature of solid phase 42 in the vessel 2 is monitored by a sensor (not shown) which causes the regulating means to open a slide valve or gate 45 in the outlet at the lower end of the vessel 2 as soon as the temperature of the solid fraction 42 is reduced below that at which the solid fraction would be combusted in response to contact with air or oxygen. The evacuated solid fraction 42 can be admitted into a bin such as the bin 62 shown in the lower part of FIG. 2.

The regulating means of the apparatus which is shown in FIG. 1 is set up to ensure that the charge in the upper vessel is preheated, dried and carbonized while the material (42) in the lower vessel 2 is cooled to a temperature at which the gate 45 can be safely opened without risking spontaneous combustion of the solid phase. Thus, the apparatus can simultaneously process two charges, namely a fresh charge in the vessel 1 and the solid phase of the preceding charge in the vessel 2. The gate 45 is caused to seal the outlet of the vessel 2 in response to completed evacuation of the cooled solid phase 42 into a bin, and the valve 41 thereupon again admits carbon dioxide gas 39 to expel air from the vessel 2 into the conduit 43 before the regulating means retracts the gate 46 in order to permit the hot solid phase 42 to descend from the vessel 1 into the vessel 2. Air is likely to enter the vessel 2 during evacuation of cooled solid phase, i.e., while the gate 45 is maintained in open or retracted position.

An advantage of the treatment of discrete batches or charges, as contrasted with continuous treatment of an uninterrupted stream of waste material, is that each stage of treatment (such as preheating, drying, conversion into solid and gaseous phases, and cooling) can be carried under optimum conditions as a result of appropriate selection of corresponding parameters including the application of heat, rate of mixing, optimum pressure in the vessels and cooling. The treatment takes place while the charges are sealed from the atmosphere, and the treatment of a first charge in one of the vessels takes place simultaneously with the treatment of a charge in the other vessel. For example, degasification is promoted by reducing the pressure in the vessel 1 while the charge in this vessel undergoes a pronounced mixing action. All this contributes to greater economy and to a higher output in valuable gaseous, liquid and solid products than in connection with a continuous treatment of an uninterrupted stream of waste material in a single vessel. Actually, the improved process is quasi continuous because several charges are treated simultaneously. The improved process exhibits the additional advantage that, if desired or necessary (refer to FIG. 3), ingredients which are released during a particular stage of treatment (such as drying) can be evacuated from the respective vessel independently of volatile ingredients which are released during a different stage (such as conversion into solid and gaseous phases). Thus, water vapors which are released during drying can be evacuated independently of the gaseous phase which is obtained as a result of conversion of a dried charge into solid and gaseous phases. Therefore, the apparatus can operate without expensive devices for separation of several volatile constituents. Still further, the improved apparatus for treatment of discrete charges is more compact than an apparatus for continuous processing of an uninterrupted stream of waste material; this is due to the fact that the charges can be treated in close proximity to each other as well as because periods of dwell of charges in a particular vessel are not dependent upon the length of the path for waste material as in an apparatus for continuous treatment of such material. Mixing of discrete charges during certain stages of treatment can be carried out by resorting to relatively simple and inexpensive mixing units which can readily stand the temperatures in the corresponding vessels.

The vessels of the improved apparatus are preferably designed to ensure proper sealing of charges from the surrounding atamosphere irrespective of whether the pressure in the vessels is below or above atmospheric pressure. For example, the vessels can be designed to ensure a reliable sealing action within a pressure range of 0.5 to 3 bar. Such sealing is desirable and advantageous for proper treatment of the charges as well as because it reduces the likelihood of escape of malodorous gaseous phases into the surrounding atmosphere.

The capacities of the vessels 1 and 2 may but need not be the same. The dimensions of the vessels will be selected in dependency upon the desired quantity of waste material in a charge and also in dependency upon the extent to which the bulk of a charge is reduced as a result of one or more treatments in the preceding vessel. This renders it possible to further reduce the space requirements of the apparatus.

The variable-speed mixing unit 17 exhibits the advantage that it enables the regulating means to vary the corresponding parameter during different stages of treatment of a charge in the vessel 1. This renders it possible to further reduce the energy requirements of treating means forming part of the improved apparatus. For example, the speed of the motor 18 for the shaft 19 of the mixer 17 can be varied during each drying stage to take into consideration that the charge is likely to be of lumpy consistency during the initial stage of the drying operation but is thereupon converted into a loose mass of smaller particles as the drying operation progresses. The same applies for other parameters, such as heating and cooling, i.e., it is possible to vary the heating action during preheating, drying and/or conversion of charges in the vessel 1, and it is possible to vary the cooling action during treatment of solid phases 42 in the vessel 2.

It is further desirable to regulate one or more parameters (especially heating and mixing of a freshly admitted charge in the vessel 1) in such a way that the duration of the most time consuming stage of treatment in the vessel 1 is reduced to a minimum. This entails a reduction of the entire treatment of a charge. Thus, and since a freshly admitted charge must take up a maximum amount of heat during preheating, the preheating stage is or can be carried out while the heating unit 8 transmit a maximum amount of heat and while the mixing unit 17 operates at an optimum speed to ensure rapid preheating of the charge. In other words, it is desirable to optimize that stage of treatment which takes up more time than the other stages. This ensures that the output of the apparatus can be increased without affecting the quality of treatment.

The gas which is drawn from the tank 30 and is combusted in the burner 13 constitutes but a small fraction of the total fuel (oil, solid phase and gaseous fuel) which is recovered from waste material.

The utilization of inert carbon dioxide gas 39 as a means for expelling air from the vessel 2 constitutes an optional but highly desirable feature of the apparatus. Thus, the inert gas 39 (which is a byproduct of the converting stage in the vessel 1) can be put to use prior to being discharged into the atmosphere (either by way of the valve 41 or through the conduit 43 and valve 44).

Figure 2:
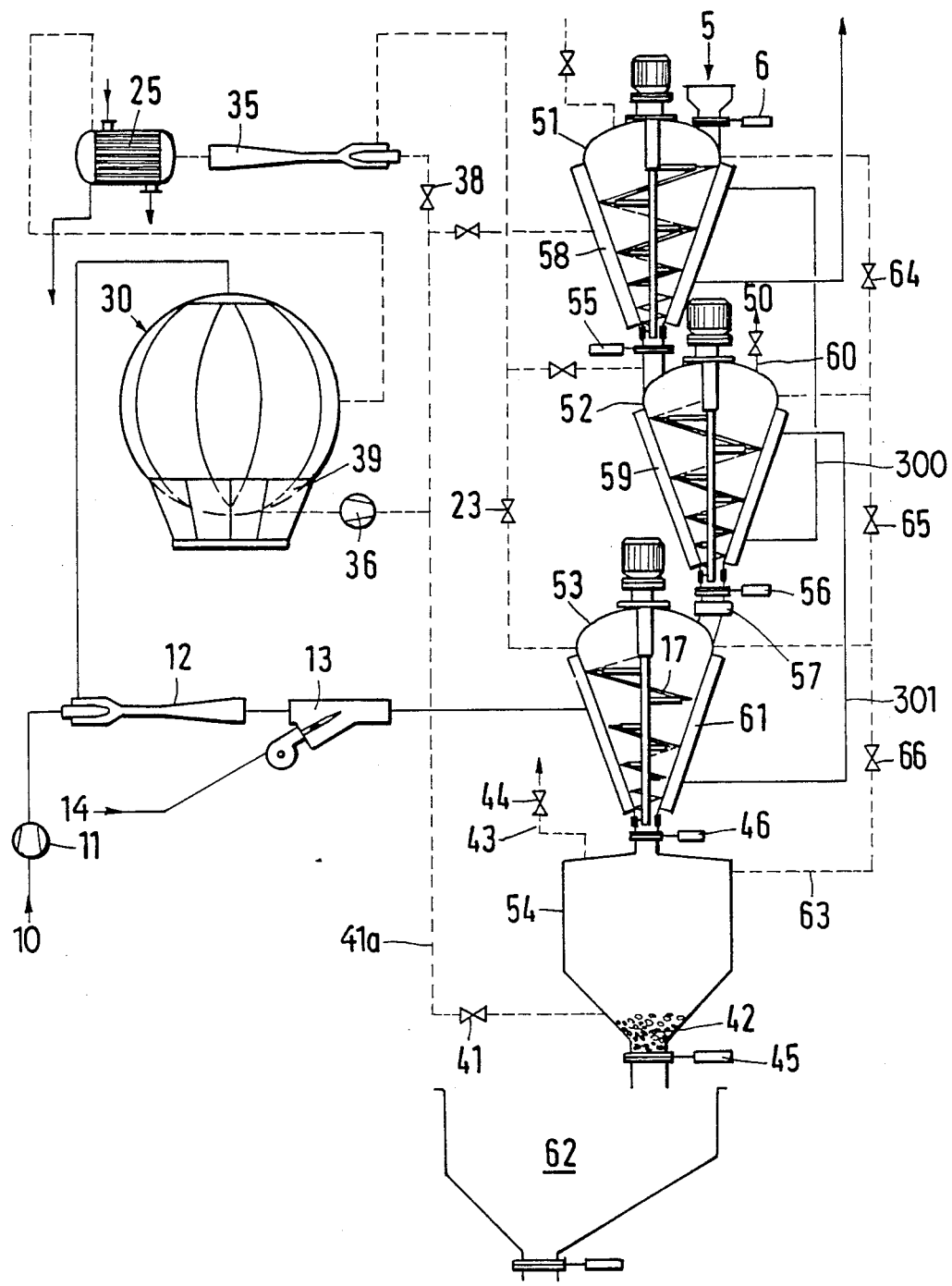
FIG. 2 is a diagrammatic view of a second apparatus with four series-connected vessels.
Figure 3:
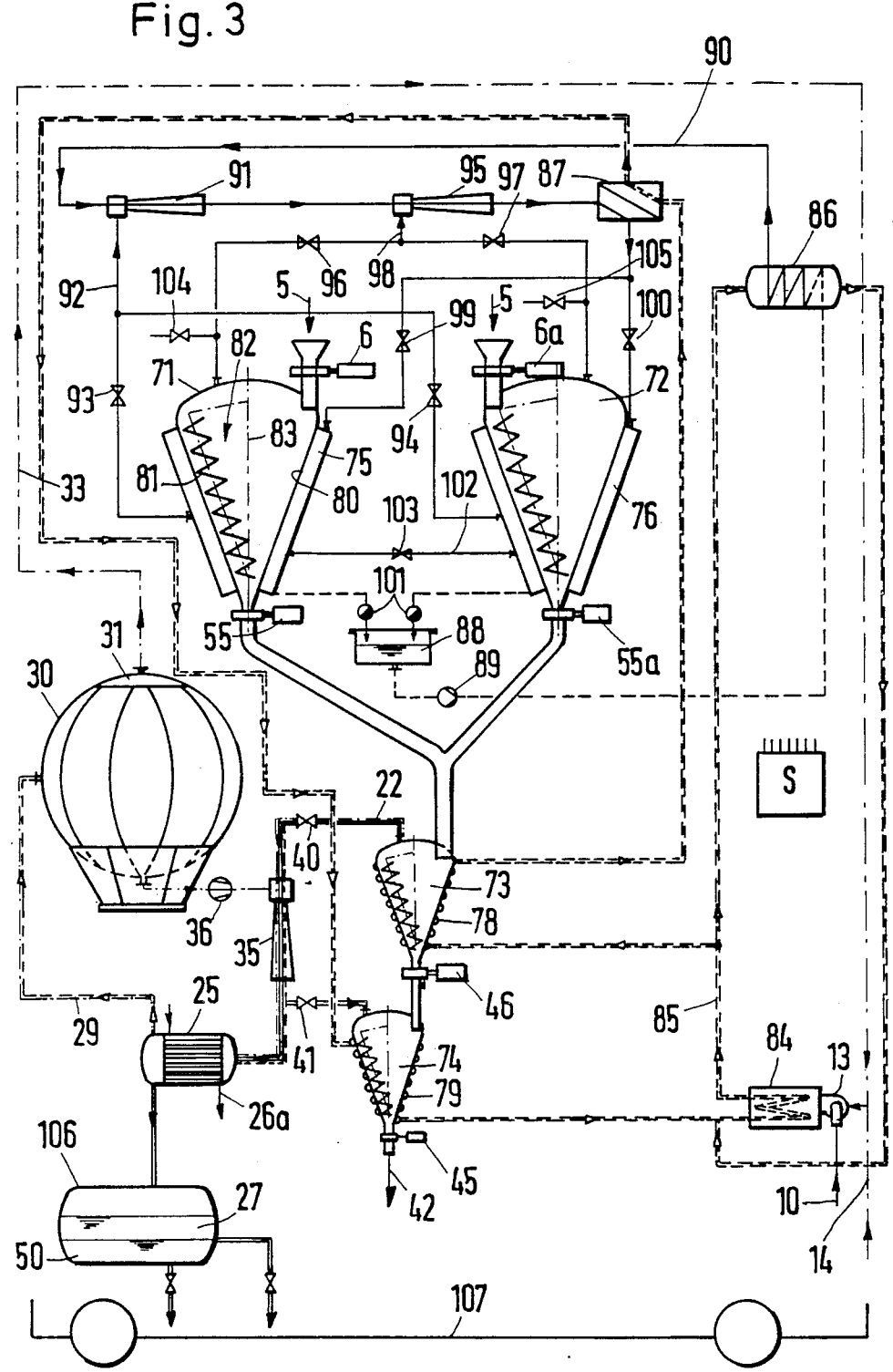
FIG. 3 is a diagrammatic view of a third apparatus with four vessels including first and second vessels which are connected in parallel, a third vessel in series with the first and second vessels, and a fourth vessel in series with the third vessel.
Figure 4:
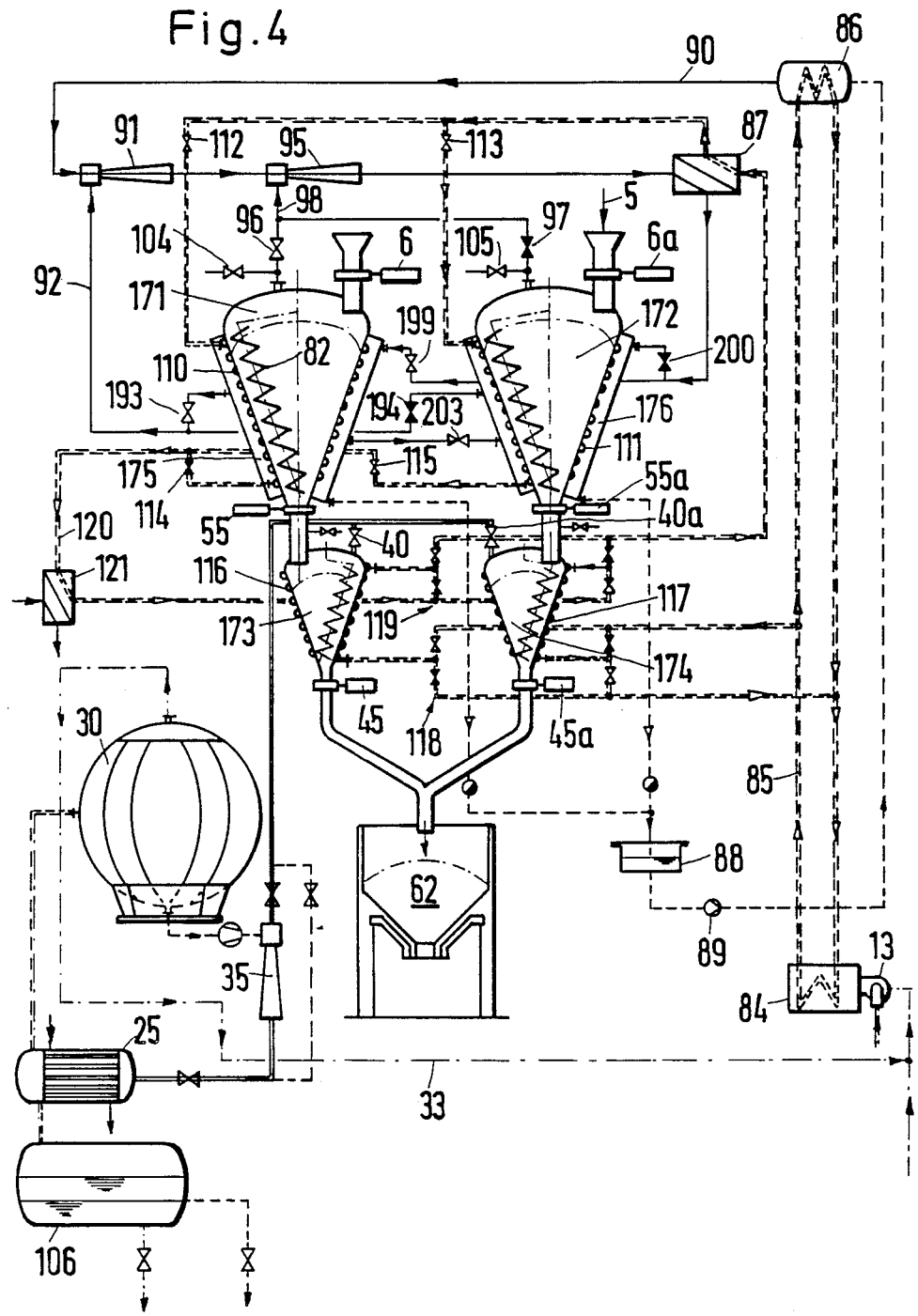
FIG. 4 is a diagrammatic view of a fourth apparatus which constitutes a modification of the apparatus of FIG. 3 and employs two pairs of vessels, the vessels of each pair being connected in parallel and each vessel of one pair of vessels being in series with a vessel of the other pair of vessels.
Figure 5:
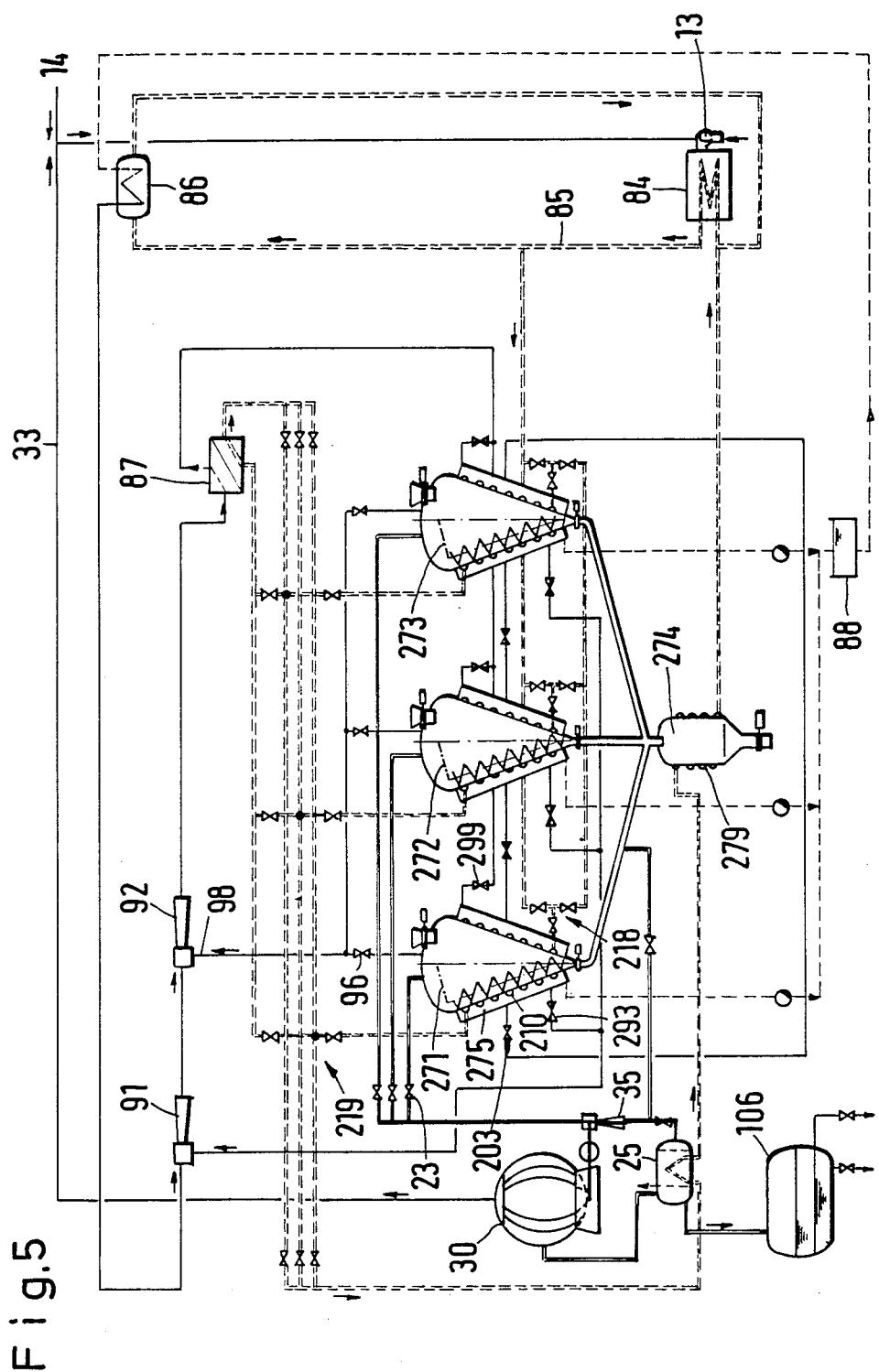
FIG. 5 is a diagrammatic view of a fifth apparatus which constitutes a further modification of the apparatus of FIG. 3 and employs three vessels which are connected in parallel and a fourth vessel in series with each of the three vessels.

FIG. 2 shows a second apparatus wherein all such parts which are identical with or clearly analogous to corresponding parts of the apparatus of FIG. 1 are denoted by similar reference characters. This also applies for the apparatus which are shown in FIGS. 3, 4 and 5. The means for sealing discrete charges of waste material or certain constituents of such material includes four vessels 51, 52, 53 and 54 which are connected in series and in each of which a charge or the solid phase of a charge undergoes a different treatment. Fresh charges are admitted into the topmost vessel 51 in the direction of arrow 5 by way of the inlet which can be sealed by the retractible gate 6. A slide valve or gate 55 is common to the outlet of the vessel 51 and the inlet of the vessel 52, a further slide valve or gate 56 is common to the outlet of the vessel 52 and the inlet of the vessel 53, and the slide valve or gate 46 controls the transfer of solid phase 42 from the outlet of the vessel 53 into the inlet of the vessel 54. The gate 45 in the outlet of the vessel 54 must be retracted in order to permit admission of cooled solid phase 42 from the vessel 54 into the bin 62.

A grinding or comminuting unit 57 is installed in the inlet of the vessel 53 beneath the gate 56 to comminute the charge which is in the process of leaving the vessel 52 on its way into the vessel 53. Such comminution promotes conversion of the dried charge into solid and gaseous phases in the interior of the vessel 53.

Each of the vessels 51, 52, 53 contains a mixing unit 17 which is or which can be identical with the mixing unit in the vessel 1 of FIG. 1. If the vessel 54 is sufficiently large to receive several successive solid phases 42 in response to repeated opening of the gate 46, the provision of specially designed cooling means (such as the means 47 for cooling the solid phase 42 in the vessel 2 of FIG. 1) can be dispensed with, i.e., the contents of the vessel 54 can be cooled by the surrounding atmospheric air. The same applies for a mixing unit, i.e., the vessel 54 need not be equipped with a mixing unit (such as 17a in the vessel 2 of FIG. 1) if this vessel is capable of accepting a reasonably large number of successively admitted solid phases 52.

The heating means of the means for treating charges and solid phases in the vessels 51 to 54 comprises a heating unit 58 with a twin jacket surrounding the downwardly tapering conical lower portion of the vessel 51. The heating unit 58 is designed to preheat and dry the freshly admitted charge in the vessel 51 to a temperature of approximately 115° C. The charge is then admitted into the vessel 52 in response to opening of the gate 55 and is heated to a temperature of approximately 180°-200° C. by a heating unit 59 having a twin jacket surrounding the conical lower portion of the vessel 52. This results in evaporation of the major part of reaction water 50; the vapors are evacuated in response to opening of a valve in a conduit 60 which communicates with the substantially dome-shaped upper portion of the vessel 52. A condenser (not shown) can be provided to recover evaporation heat from vapors which leave the vessel 52 by way of the conduit 60.

When the treatment of a charge in the vessel 52 is completed, the regulating means of the apparatus of FIG. 2 retracts the gate 56 which admits the charge (minus evaporated reaction water) into the vessel 53 by way of the comminuting unit 57. A third heating unit 61 includes a twin jacket which surrounds the conical lower portion of the vessel 53 and serves to heat the contents of this vessel to a temperature of at least 200° C. but preferably not more than 600° C. This results in conversion of the contents of the vessel 53 into a solid phase (coke) 42 and a gaseous phase. The composition of the gaseous phase is the same as described in connection with FIG. 1. The solid phase 42 is admitted into the vessel 54 in response to opening of the gate 46 so that the solid phase enters the vessel 54 and is adequately cooled to below combustion temperature prior to opening of the gate 45, i.e., prior to admission into the bin 62. Admission of a fresh solid phase 42 into the vessel 54 is preceded by expulsion of air and oxygen in response to opening of the valve 41 so that condensed carbon dioxide gas can flow from the condenser 36 into the vessel 54. The top of the bin 62 is open since its contents are adequately cooled in the vessel 54 prior to opening of the gate 45.

A conduit 63 is provided to connect the interior of the vessel 51 with the interior of the vessel 52 in response to opening of a valve 64, to connect the interior of the vessel 52 with that of the vessel 53 in response to opening of a valve 65, and to connect the interior of the vessel 53 with that of the vessel 54 in response to opening of a valve 66. Such equalization of pressures in successive vessels of the four series-connected vessels takes place prior to opening of the respective gates 55, 56 and 46.

Hot combustion products which are discharged by the burner 13 are admitted first into the twin jacket of the heating unit 61 for the contents of the vessel 53 (wherein the charge is heated to a maximum temperature of 200°-600° C.). The partially cooled combustion products are conveyed in a conduit 301 from the jacket of the heating unit 61 into the jacket of the heating unit 59 for the contents of the vessel 52, and the thus cooled combustion products are conveyed in a conduit 300 from the jacket of the heating unit 59 into the jacket of the heating unit 58 for the contents of the vessel 51. Such repeated utilization of combustion products which are supplied by the burner 13 results in substantial savings in heat energy.

The apparatus of FIG. 2 exhibits the advantage that the medium which is used to heat charges in the vessel 53 can be used to heat charges in the vessel 52 as well as to heat charges in the vessel 51. The aforediscussed connections between the heating units 58, 59 and 61 contribute to a reduction of energy requirements of the apparatus as a result of optimum utilization of hot combustion products which are generated by the burner 13.

It is often preferred to select the parameters which influence the charges in the vessels 51 to 54 in such a way that the period of treatment in one of the vessels equals or closely approximates the period of treatment in each other vessel. This renders it possible to simplify the controls of the apparatus, e.g., because the gates 6, 55, 56, 46 and 45 can be opened and closed simultaneously and at identical intervals.

The total number of stages of a complete treatment need not exceed four but can be reduced to three, for example, if it is not necessary to cool the solid phase 42 prior to evacuation from the vessel wherein the conversion into gaseous and solid phases takes place. It has been found that the operation of the apparatus can be optimized if the stages include preheating, drying and conversion into solid and gaseous phases. Segregation of the preheating and drying stages renders it possible to economize with heat energy because the heat energy requirements of a freshly admitted charge of waste material for the purpose of preheating can depart considerably from those during drying preparatory to conversion into gaseous and solid phases. Moreover, preheating of a freshly admitted charge must take place at a relatively low temperature, whereas the drying stage and particularly the conversion stage necessitates heating to a higher or much higher temperature. Segregation of the second and third stages renders it possible to evacuate (from the vessel 52) vaporized reaction water (at 60) independently of the gaseous phase which is evacuated from the vessel 53 via valve 23. As already explained above, this renders it possible to operate without expensive aggregates for separation of water vapors from a gaseous phase which contains oil, carbon monoxide, carbon dioxide and/or other substances.

The preheating operation preferably takes place at a pressure above water evaporation pressure, and the drying operation preferably takes place below such pressure. Thus, evaporation of reaction water is suppressed in the vessel 51 but is promoted in the vessel 52. This can be further enhanced by appropriate selection of temperatures in the vessels 51 and 52 to ensure that all or nearly all water vapors which do not develop as a result of evaporation of reaction water can be evacuated from the vessel 52 prior to admission of the remainder of the charge into the vessel 53. This results in considerable shortening of the drying stage with attendant reduction of the overall cost of treatment.

It has been found that the apparatus of FIG. 2 will operate quite satisfactorily if the pressure in the vessel 51 is slightly above atmospheric pressure and the freshly admitted charge is preheated to a temperature of slightly above 100° C., and if the pressure in the vessel 52 is slightly below atmospheric pressure and the temperature during drying is approximately 100° C. An optimum range of temperatures in the vessel 51 is 105°-130° C., and an optimum temperature range in the vessel 52 is 90°-115° C.

In comparison with the apparatus of FIG. 1, the apparatus of FIG. 2 exhibits the advantage that the parameters for preheating, drying, conversion and cooling of successive charges can be selected with utmost accuracy. On the other hand, the apparatus of FIG. 1 exhibits the advantage that the treatment of a charge can be completed within a shorter interval of time because it is not necessary to transfer the charge from a preceding vessel into the next-following vessel upon completion of the preheating stage and/or upon completion of the drying stage. The apparatus of FIG. 2 exhibits the additional advantage that the adjusting or regulating means of the treating means can be simplified because it is not necessary to drastically change the parameters for treatment of successive charges in successive vessels of the means for sealing the charges from each other and from the atmosphere. Thus, the parameters (such as the application of heat, the selection of pressure and/or the mixing action) in the vessel 51 need not be changed to a considerable extent upon completed transfer of a preheated charge from the vessel 51 into the vessel 52 because the vessel 51 serves exclusively for preheating of the charges. This also applies for the vessels 52, 53 and 54 which respectively serve exclusively for drying, conversion and cooling of successive charges (vessels 52, 53) and solid phases 42 (vessel 54). In addition, it is possible to select the capacity of each vessel and/or the area of contact with the respective heating or cooling unit for optimum treatment of charges and solid phases during the respective stages of a four-stage treatment.

The operation of the apparatus of FIG. 2 is practically continuous, especially if the treatment of charges and solid phases is selected in such a way that the interval of preheating in the vessel 51 equals or approximates the intervals of drying, conversion and cooling in the respective vessels 52, 53 and 54.

The sealing means of the apparatus which is shown in FIG. 3 comprises two vessels 71, 72 which are connected in parallel, a third vessel 73 which is connected in series with the vessels 71, 72, and a fourth vessel 74 in series with the vessel 73. Each of the vessels 71, 72 serves for preheating and drying of discrete charges which are admitted (arrows 5) by way of the respective inlets 5, the vessel 73 serves for carbonization of charges which are discharged by the vessels 71, 72, and the vessel 74 serves for cooling of solid phases 42 which are discharged by the vessel 73. The inlets of the vessels 71, 72 can be sealed by retractible gates 6 and 6a; the outlets of the vessels 71, 72 can be sealed by retractible gates 55 and 55a; the outlet of the vessel 73 can be sealed by a retractible gate 46; and the outlet of the vessel 74 can be sealed by a retractible gate 45.

The conical lower portions 80 of the vessels 71, 72 are surrounded by the twin jackets of heating units 75 and 76; the conical lower portion of the vessel 73 is surrounded by the helical coil of a tubular heating unit 78; and the conical lower portion of the vessel 74 is surrounded by the helical coil of a tubular cooling unit 79. Each vessel further contains a mixing unit 82 having a spiral mixing element 81 which is adjacent the internal surface of the respective conical lower portion 80 and is driven about the vertical axis 83 of the respective vessel. Each mixing element 81 further rotates about its own axes so that it performs a composite movement including an orbital movement about the axis 83 and a rotary movement about its own axis. Such mode of operating the mixing elements 81 results in a highly satisfactory (intensive and energy-saving) mixing action. The intensity of the mixing action can be regulated in a manner similar to that described for the mixing unit 17 of FIG. 1, namely by varying the speed of orbital movement of the mixing elements 81 about the respective axes 83 and/or by varying the speed of rotary movement of the mixing elements about their own axes. Mixing units similar to those shown in FIG. 3 are disclosed, for example, in German Pat. No. 35 12 887. The mixing units 82 are simple and rugged as well as capable of properly intermixing the ingredients of and loosening the charges. In addition, they can prevent deposition of the material of charges along the internal surfaces of conical portions 80 of the vessels 71–74.

The apparatus of FIG. 3 further comprises a heat exchanger 84 which operates with a heat exchange fluid (such as oil). The heat exchange fluid is heated by combustion products which are generated by the burner 13, and the thus heated heat exchange fluid is conveyed by a conduit 85 to a boiler 86 which generates power steam, to the heating unit 78 for the vessel 73, and to a steam superheater 87. From the superheater 87, the heat exchange fluid flows to the cooling unit 79 for the vessel 74, and thereupon back to the heat exchanger 84.

A condensate collecting tank 88 gathers a body of water which is pumped into the boiler 86 by a pump 89. A conduit 90 conveys power steam from the boiler 86 to a steam jet compressor 91. The latter draws steam by suction from the jacket of the heating unit 75 via conduit 92 which contains a valve 93, and from the jacket of the heating unit 76 via valve 94. Steam which is supplied via conduits 90 and 92 suffices to operate a steam jet vacuum pump 95 which serves to draw steam from the vessels 71 and 72 by way of conduits 98 which contain valves 96, 97. Steam is superheated in the superheater 87 prior to being supplied to the treating means, namely to the heating unit 75 and 76, through valves 99 and 100. Condensate which develops when steam exchanges heat is evacuated by condensate separators 101 which admit condensate into the collecting tank 88. A conduit 102, containing a valve 103, serves to connect the heating unit 75 in series with the heating unit 76.

Adjustable pressure relief valves 104 and 105 are provided to ensure that the pressure in the vessels 71 and 72 can be raised above atmospheric pressure.

The apparatus of FIG. 3 is operated as follows:

A charge of organic material which is admitted into the inlet of the vessel 71 is continuously heated and mixed upon movement of the gates 6 and 55 to closed positions whereby the unit 82 raises the temperature of the thus confined charge to approximately 110° C. The relief valve 104 is set to ensure that the pressure in the vessel 71 exceeds atmospheric pressure by approximately 2 bar. Superheated steam which is supplied by the superheater 87 first enters the heating unit 76 for the vessel 72 through the open valve 100 and thereupon the heating unit 75 for the vessel 71 via conduit 102 and valve 103.

When the heating of charge n the vessel 71 to approximately 110° C. is completed, the relief valve 104 is closed and the valve 96 is opened so that the internal space of the vessel 71 is connected to the intake of the vacuum pump 95. This results in a lowering of pressure in the vessel 71 to a pressure of 06–0.95 bar below atmospheric pressure. At the same time, the direction of circulation of heating medium is reversed by way of valves 93, 94, 99 and 100 in such a way that superheated steam which is supplied by the superheater 87 flows first into the heating unit 75 for the vessel 71 and thereupon through the conduit 102 and valve 103 into the heating unit 76 for the vessel 72. The thus changed operating conditions bring about a pronounced generation of water vapors which are mixed with steam in the vacuum pump 95 and serve to heat steam in the superheater 87. As the drying of charge in the vessel 71 progresses, the temperature in this vessel first drops to approximately 90° C. to thereupon rise again to approximately 110° C. The dried material in the vessel 71 assumes a crumby consistency which ensures that the rate of mixing of, and hence the admission of heat to, individual particles of the dried charge increases without increasing the consumption of electrical energy. This is of considerable importance because the maximum quantity of heat must be transmitted in the course of the drying operation and, therefore, it is highly desirable to reduce the interval of drying to a minimum.

The charge which is thereupon admitted into the vessel 72 in response to opening of the gate 6a is treated in the same way as the charge in the vessel 71. Thus, drying of a charge in the vessel 71 can take place simultaneously with preheating of a charge in the vessel 72.

When the drying of the charge in the vessel 71 is completed, the gate 55 is retracted to enable such charge to descend into the vessel 73 for conversion into the solid and gaseous phases. The vessel 73 is or can be much smaller than the vessels 71, 72 because the bulk of a charge is reduced considerably as a result of preheating and drying. The heating unit 78 raises the temperature of the charge in the vessel 73 from approximately 110° C. to approximately 350° C. This is achieved by supplying to the coil of the heating unit 78 heat exchanger fluid at a temperature of 350°–450° C. Vapors and gases which are discharged by the material in the vessel 73 as a result of heating to a temperature of approximately 350° C. are evacuated from the vessel 73 via conduit 22 and are admitted into the condenser 25. The initial stage of heating in the vessel 73 results mainly in the generation of steam as a result of heating of reaction water 50 which flows into the collecting receptacle 106, and the next stage of heating of the contents of the vessel 73 results primarily in the generation of oil vapors and combustible and inert gases in a manner as described in connection with FIG. 1. The gaseous phase enters the tank 30 via conduit 29, and the condensed reaction water 50 and oil 27 enter the receptacle 106 wherein they are separated from each other due to the lower specific weight of oil 27. The solid phase which remains in the vessel 73 is largely coke which is maintained at a temperature of approximately 350° C.

Air which is or which might be contained in the vessel 74 must be expelled before the solid phase 42 is transferred from the vessel 73. This is achieved by opening the valve 41 and by closing the valve 40 so that the inert $CO_2$ gas can flow from the compressor 36 into the interior of the vessel 74 to expel air in a manner as described, for example, in connection with FIG. 1 (note the conduit 43 and valve 44). The gate 46 is thereupon retracted so that the solid phase 42 is transferred from the vessel 73 into the vessel 74 wherein it is continuously mixed and is simultaneously cooled by heat exchange fluid flowing from the superheater 87 back to the heat exchanger 84 via cooling unit 79. When the temperature of the solid phase 42 in the vessel 74 is reduced below combustion temperature, the gate 45 is opened and the cooled solid phase is transferred into a bin, not shown in FIG. 3.

The regulating means in the apparatus of FIG. 3 ensures that the treatment of charges in the vessels 71, 72 alternates, that the vessel 73 receives dried charges from vessels 71, 72, and that the vessel 74 receives the solid phase 42 from the vessel 73. As mentioned above, preheating of charges in the vessel 71 takes place simultaneously with drying of charges in the vessel 72, and vice versa.

FIG. 3 further shows the frame 107 of a wheel-mounted conveyance for the entire apparatus. The conveyance that the apparatus can be readily transported to and from different locales of use and/or to storage.

FIG. 3 also shows a programming unit S of the regulating means. The unit S has several inputs and outputs which are connected with the gates, valves, mixing units and other components of the treating means to ensure that all operations can be carried out in a predetermined sequence.

In the apparatus of FIG. 3, combustion products which are generated by the burner 13 are used to indirectly heat the contents of the vessels 71 to 73, i.e., such combustion products exchange heat with the heat exchange fluid in the heat exchanger 84, and the heat exchange fluid heats the contents of the vessel 73. In addition, the heat exchange fluid heats and superheats steam which is used to heat the contents of the vessels 71 and 72. This, too, contributes to economy of operation of the improved apparatus. Additional savings are achieved because the cooled heat exchange fluid is used to cool the contents of the vessel 74.

In comparison with the apparatus of FIG. 2, the apparatus of FIG. 3 exhibits the advantage that it is not necessary to transfer the charges from preceding vessels into the next-following vessels upon completion of the preheating stages of treatment. Thus, and as already pointed out in connection with FIG. 1, this renders it possible to shorten the intervals which are required for complete treatment of successive charges.

The feature that the vessels 73, 74 are smaller than the vessels 71 and 72 renders it possible to reduce the overall height and to reduce the initial and maintenance cost of the apparatus.

The conveyance including the frame 107 is an optional feature of the apparatus. Such conveyance is desirable and advantageous because it renders it possible to transport the apparatus to a supply of waste material which is often much less expensive than transporting waste material to the apparatus.

The utilization of oil or another heat exchange fluid for the heating of steam, for carrying out the conversion of dried charges into solid and gaseous phases, and for cooling of solid phases also contributes to more economical operation of the apparatus. The same applies for the utilization of stream, which is expelled from the vessels 71 and 72, as a means for heating the contents of these vessels from without.

The improved apparatus need not heat the charges from within, e.g., by admitting steam into the vessels as proposed in one of the aforediscussed prior art references. Admission of steam into the vessel for a charge cannot ensure a predictable heating of the confined material. Moreover, steam which is admitted into a vessel is mixed with the gaseous phase therein and must be segregated from oil, combustible gases and inert gases at an additional cost.

FIG. 4 shows a further apparatus which constitutes a first modification of the apparatus of FIG. 3 and includes two vessels 171, 172 which operate in parallel and two vessels 173, 174 which are respectively in series with the vessels 171 and 172. The charge in the vessel 171 is preheated while the preheated charge in the vessel 172 is dried, and vice versa, the same as described in connection with the vessels 71, 72 of FIG. 3. The vessel 173 carries out a converting operation when the vessel 174 carries out a cooling operation, and vice versa. An advantage of the apparatus of FIG. 4 is that the converting and cooling operations take place in one and the same vessel (173 or 174) so that it is not necessary to transfer heated solid phases 42 into a different vessel prior to admission into the bin 62. This renders it possible to dispose with the step of admitting an inert gas into the vessels (173, 174) wherein the solid phases 42 are cooled prior to admission into the bin 62.

The vessel 171 is equipped with a first heating unit 175 which comprises a twin jacket for a heating fluid in the form of steam, and a second heating unit 110 which comprises a heating tube and is used to heat the contents of the vessel 171 with oil or another suitable heat exchange fluid. Analogously, the vessel 172 is equipped with a first heating unit 176 which is analogous to the heating unit 175, and with a second heating unit 111 corresponding to the heating unit 110. Valves 112, 113, 114, 115 are provided to alternatively supply heat exchange fluid to the heating units 110, 111, and valves 193, 194, 199, 200 and 203 are provided to alternatively supply steam to the heating units 175 and 176.

The contents of the vessels 173 and 174 are respectively heated and cooled by combined tubular heating and cooling units 116 and 117 which can be switched from heating to cooling and vice versa by way of valves 118 and 119. The unit 116 heats the contents of the vessel 173 during conversion of the charge in the vessel 173 into gaseous and solid phases; at the same time, the unit 117 cools the solid phase in the vessel 174. The unit 117 heats the charge in the vessel 174 during conversion into solid and gaseous phases and, at the same time, the unit 116 cools the solid phase in the vessel 173. The units 116, 117 are connected in series with the heating units 110, 111, respectively. Spent (cooled) heat exchange fluid is caused to return into a heat exchanger 121 via conduit 120 and to flow from the heat exchanger 121 to the unit 116 or 117 via valve 119, 118, respectively. The character 40a denotes a valve for evacuation of gaseous phase from the vessel 174.

In all other respects, the operation of the apparatus of FIG. 4 is or can be identical with that of the apparatus which is shown in FIG. 3.

When compared with the apparatus of FIG. 3, the apparatus of FIG. 4 exhibits the advantage that the interval which elapses for the treatment of a charge is reduced considerably because the cooling of solid phases need not be preceded by a transfer of solid phases from the preceding vessel into a next-following vessel. On the other hand, the apparatus of FIG. 3 exhibits the advantage that the parameters for treatment of materials in the vessels 73 and 74 need be changed to a considerable extent because the vessel 73 serves exclusively for conversion of charges into solid and liquid phases and the vessel 74 serves exclusively for cooling of successive solid phases. The apparatus of FIG. 4 exhibits the additional advantage that it is not necessary to expel air from the vessels 173, 174 prior to cooling of the solid phases therein. It has been found that the operation of the apparatus of FIG. 4 is particularly economical, not only as concerns the intervals of time which are required for completion of treatment of a charge but also as concerns the energy requirements for preheating, drying, conversion and cooling of the charges and their solid phases.

The apparatus of FIG. 5 constitutes a second modification of the apparatus of FIG. 3. Its sealing means comprises three vessels 271, 272, 273 which are connected in parallel and each of which is equipped with means for preheating, drying and converting a charge therein into solid and gaseous phases. A fourth vessel 274 is in series with each of the vessels 271-273 and cooperates with means for cooling solid phases which are delivered from the vessels 271-273. The vessels 271-273 receive charges of untreated waste material at different intervals of time so that preheating of a charge in the vessel 171 is completed when the drying of a charge in the vessel 272 is completed and the conversion of a charge into solid and gaseous phases in the vessel 273 is completed. This ensures that the outlets of the vessels 271-273 discharge solid phases at intervals and that each such solid phase can be cooled in a single vessel (274).

Each of the vessels 271-273 is equipped with two heating units, namely a steam-operated heating unit 275 having a twin jacket, and a spiral heating unit 210 which employs a helically convoluted tube for oil or another suitable heat exchange fluid. Valves 293 and 299 are provided to selectively connect the heating units 275 of the vessels 271-273 with the steam superheater 87. Valves 203 serve to ensure equalization of pressures during successive heating steps in the vessels 271, 272 and 273. Assemblies of valves 218, 219 serve to ensure admission of heat exchange fluid to the heating unit 210 for that one of the vessels 271-273 which contains a dried charge so that the heat exchange fluid ensures rapid conversion of the charge into gaseous and solid phases.

The internal sapces of the vessels 271-273 can be connected with the evacuating conduit 98 by way of valves 96, and with the pump 35 and condenser 25 via valves 23.

It is now assumed that the vessel 271 contains a charge which is in the process of being preheated, that the charge in the vessel 272 is in the process of being dried, and that the charge in the vessel 273 is in the process of being converted into gaseous and solid phases. At such time, the contents of the vessel 273 are heated with the hot heat exchange fluid which thereupon flows through the superheater 87, through the tubular heating unit for the vessel 272 (wherein the charge is in the process of being dried), and ultimately through the tubular heating unit 210 for the vessel 271 (wherein the charge is in the process of being preheated). The heat exchange fluid thereupon flows through the condenser 25 and the cooling unit 279 for the contents of the vessel 274. Superheated steam flows from the superheater 87 into the twin-jacket heating unit for the contents of the vessel 272 and thereupon into the twin-jacket heater for the contents of the vessel 271. Steam which has entered the jacket of the heater for the vessel 271 is withdrawn by the condenser 91, and the condensate is admitted to the receptacle 88. It will be noted that the contents of those vessels (271 and 272) which require large quantities of heat for rapid and effective completion of the respective treatments (preheating and drying) receive heat from both heating units for the respective vessels.

It is not necessary that the treatment of a charge in the vessel 271 take up the same interval of time as the simultaneous treatment of a charge in the vessel 272 and/or 273. In other words, preheating of a charge can take longer or can be completed sooner than the drying of a charge or conversion of a charge into solid and gaseous phases. All that is necessary is that the sum of the first three treatments (preheating, drying and conversion into solid and gaseous phases) equal three times the intervals at which the inlets of the vessels 271, 272 and 273 receive fresh charges and at which the outlets of the vessels 271–273 admit solid phases into the vessel 274.

In comparison with the apparatus of FIGS. 3 and 4, the apparatus of FIG. 5 exhibits the advantage that the intervals for complete treatment of charges are reduced still further because the preheating, drying and conversion of each charge take place in one and the same vessel (271, 272 or 273). As a rule, the interval of cooling of a solid phase in the fourth vessel 274 will take up approximately one-third of the interval which is required to complete the preheating, drying and conversion of a charge in the vessel 271, 272 or 273.

An important advantage of each embodiment of the improved process and apparatus is that the treatment of charges takes place in vessels which are sealed from the atmosphere in such a way that malodorous constituents cannot escape irrespective of whether the pressure in the vessels is above or below atmospheric pressure. Suitable cleaning and segregating devices can be provided at the locations for evacuation of raw oil, reaction water, surplus condensate and/or other fractions which would be likely to odorize the surrounding atmosphere.

The aforedescribed apparatus can be modified in a number of additional ways without departing from the spirit of the invention. For example, the superheater 87 can be omitted. Furthermore, the condenser 91 and the vacuum pump 92 can be connected in parallel.

The charges which are admitted into the vessel 1, into the vessel 51, into the vessels 71, 72, into the vessels 171, 172 or into the vessels 271–273 can contain organic or inorganic ingredients or a mixture of both. Though an inorganic material cannot yield oil and coke, the drying and, if necessary, further degasification (reaction water and products of decomposition) can result in considerable reduction of weight and volume. Therefore, the residue of treated inorganic charges can be more readily transported away and disposed of than heretofore, especially if the residue is of pulverulent consistency.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for converting waste material at temperatures of 200° to 600° C. into a solid phase and a gaseous phase which is at least partially liquefiable as a result of cooling, comprising means for sealing discrete charges of waste material from the atmosphere including a plurality of vessels each of which has a sealable charge-admitting inlet for receiving a discrete charge and a sealable material-discharging outlet; means for simultaneously treating the charges in said vessels including means for mixing the charge in at least one of said vessels, means for externally heating said at least one vessel and means for maintaining the pressure in said at least one vessel above atmospheric pressure during heating of the charge therein to convert the charges in said at least one vessel into a solid phase and a gaseous phase including fuel gases and an inert gas; means for lowering the pressure in at least one of said vessels below atmospheric pressure; means for accumulating said gaseous phase, said accumulating means having first outlet means for said fuel gases and second outlet means for said inert gas; means for conveying said fuel gases from said first outlet first means to said heating means and second means for conveying and admitting said inert gas from said second outlet means into at least one of said vessels so as to expel from the respective vessel oxygen which enters the vessel in response to unsealing of the corresponding inlet and/or outlet.

2. Apparatus for converting waste material at temperatures of 200° to 600° C. into a solid phase and a gaseous phase which is at least partially liquefiable as a result of cooling, comprising means for sealing discrete charges of waste material from the atmosphere including a plurality of vessels each of which has a sealable charge-admitting inlet for receiving a discrete charge and a sealable material-discharging outlet; means for simultaneously treating the charges in said vessels including means for mixing the charge in at least one of said vessels, means for externally heating said at least one vessel and means for reducing the pressure in said at least one vessel whereby the charge in the at least one vessel is converted into solid and gaseous phases; means for accumulating said gaseous phase; and means for conveying said gaseous phase from said accumulating means to said heating means, said pressure reducing means including a vacuum pump comprising a first jet compressor, said accumulating means having at least one outlet for the gaseous phase and said conveying means including a second jet compressor and means for supplying the gaseous phase from the outlet of said accumulating means to said second jet compressor.

3. Apparatus for converting moisture-containing waste material at temperatures of 200° to 600° C. into a solid phase and a gaseous phase which is at least partially liquefiable as a result of cooling, comprising means for sealing discrete charges of waste material from the atmosphere including a plurality of vessels each of which has a sealable charge-admitting inlet for receiving a discrete charge and a sealable material-discharging outlet; means for simultaneously treating the charges in said vessels including means for mixing the charge in at least one of said vessels and means for externally heating at least one of said vessels whereby the heating of a moisture-containing charge in the at least one externally heated vessel entails the generation of steam; means for evacuating said steam from the at least one externally heated vessel including a vacuum pump having a jet compressor and means for conveying evacuated steam to the heating means of said at least one externally heated vessel wherein the steam undergoes condensation, said heating means of the at least one externally heated vessel having a first outlet for condensate and a second outlet for steam, said jet compressor being connected with said second outlet; a boiler connected with said first outlet; and means for conveying steam from said boiler to said jet compressor.

4. The apparatus of claim 3, wherein said conveying means includes a superheater for said steam.

* * * * *